United States Patent [19]
Lang et al.

[11] 3,885,226
[45] May 20, 1975

[54] AIRCRAFT MULTIPLE ANTICOLLISON LIGHT SYSTEM

[75] Inventors: William J. Lang, New Port Beach; Gerald K. Brewer, Anaheim; Richard B. Fritz, Laguna Hills; Frederick W. Eggers, Huntington Beach, all of Calif.

[73] Assignee: Symbolic Displays, Inc., Irvine, Calif.

[22] Filed: Oct. 15, 1973

[21] Appl. No.: 406,592

[52] U.S. Cl............ 340/27 R; 340/81 R; 340/310 R
[51] Int. Cl................................................ G08g 5/00
[58] Field of Search...... 340/27 R, 25, 28, 77, 81 R, 340/310 R, 310 A; 240/1.2, 7.7; 307/10 LS

[56] References Cited
UNITED STATES PATENTS

| | | | |
|---|---|---|---|
| 2,571,158 | 10/1951 | Orlansky | 240/7.7 |
| 2,777,120 | 1/1957 | Madsen | 340/77 |
| 3,500,132 | 3/1970 | Garrett | 340/310 |
| 3,676,736 | 7/1972 | Starer | 240/7.7 |
| 3,735,115 | 5/1973 | Adler | 240/7.1 |

Primary Examiner—John W. Caldwell
Assistant Examiner—Richard P. Lange

[57] ABSTRACT

This specification discloses a multiple anticollision light system for an aircraft having a cockpit timer module, a power supply and decoder module, and a combination light assembly or module connected thereto. The timer module is mounted in the cockpit and serves to emanate a pulse along the original or new indicator light wiring system to the power supply and decoder module. The power supply and decoder module decodes the original signal as emanated from the timer module and serves to trigger a high intensity light in a combination light assembly.

The high intensity light sends out a high intensity beam so that aircraft in surrounding relationship can effectively detect the presence of an aircraft bearing the lighting system of this invention. As an additional feature, the invention incorporates the usage of the original wiring of the aircraft so that the entire aircraft does not have to be disassembled or rewired.

20 Claims, 9 Drawing Figures

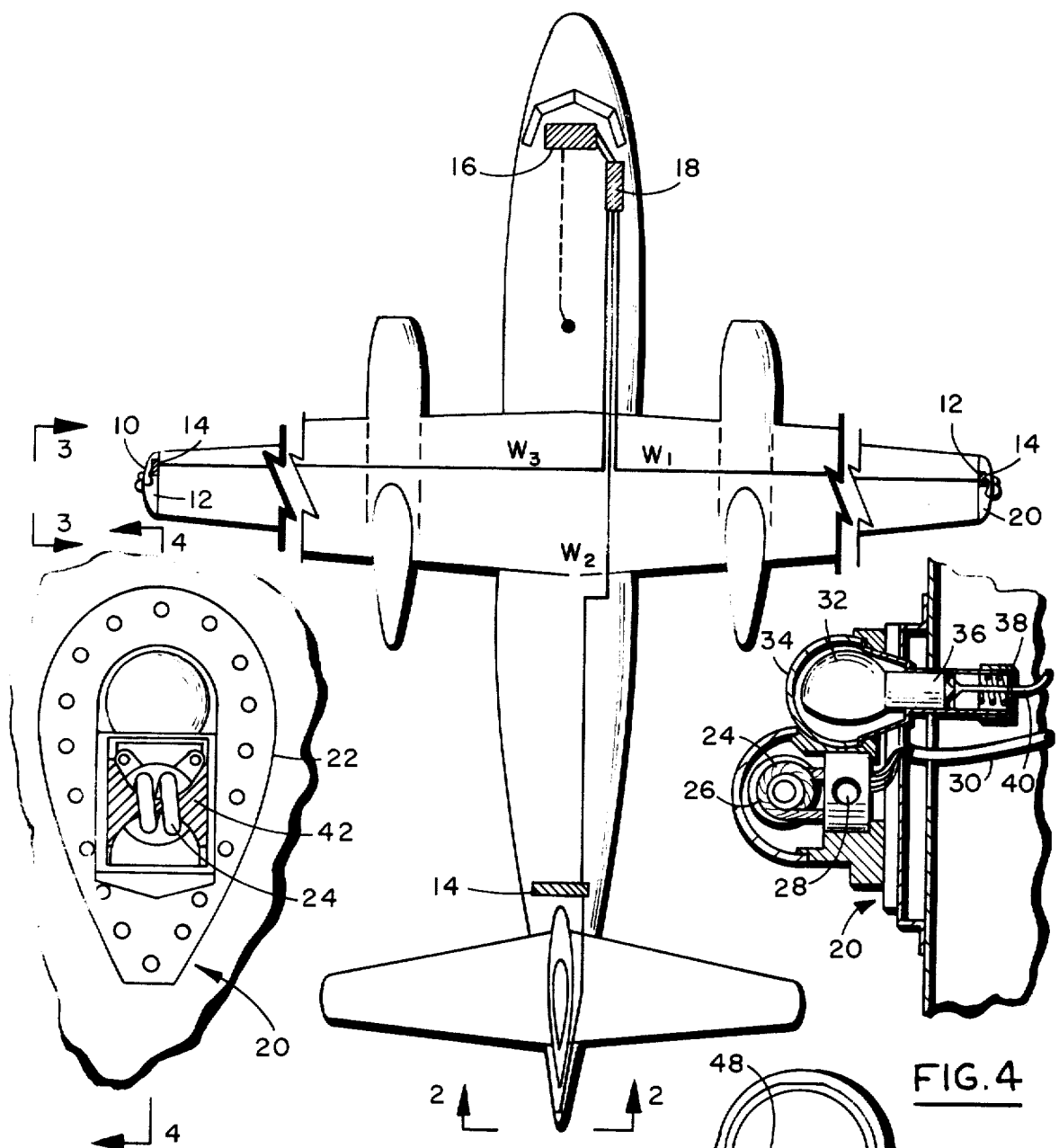
FIG. 3
FIG. 1
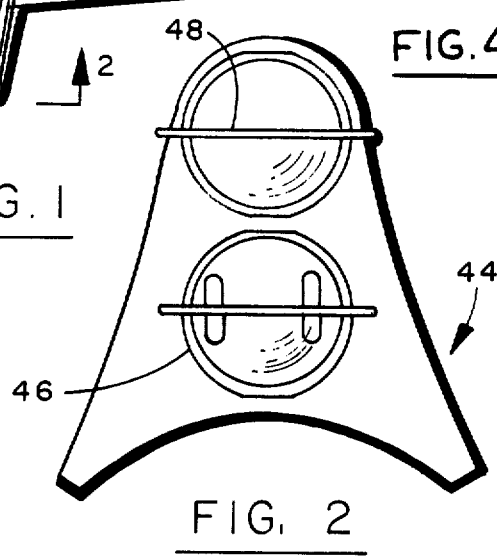
FIG. 4
FIG. 2

AIRCRAFT MULTIPLE ANTICOLLISON LIGHT SYSTEM

BACKGROUND OF THE INVENTION

1. Field of the Invention

The field of this invention lies within the art of aircraft warning lights. Specifically, this invention is within the art of position indicators or navigation lights in combination with high intensity flashing lights in order to avoid collisions though adequate warning lights.

2. The Prior Art

The prior art related to position indicator lights and warning lights for aircraft generally incorporates two types of lights. Specifically, incandescent, port, starboard and tail position indicator lights are generally incorporated with the aircraft. The port and starboard indicator lights are generally placed on the wing tips to respectively indicate the placement of the aircraft as to its position. The tail usually incorporates a light which can be placed thereat to show that the three points of the aircraft, namely the wing tips and the tail, are in a certain location. As is customary, such lights can burn constantly during the flight of the aircraft.

In addition to the foregoing position indicator lights, it is oftentimes customary to have a flashing high intensity light located somewhere on the aircraft. Oftentimes, high intensity flashing lights are located on the fuselage somewhere between the wing tips and the tail in a generally central location. The high intensity flashing lights serve to enunciate the fact that an aircraft is in a particular location.

Although the foregoing lights have been serviceable, and instrumental in indicating the fact that an aircraft is in a certain location, they have not been fully effective. Specifically, if the high intensity flashing lights are on the top or the bottom of a fuselage, they cannot be seen effectively by other aircraft unless they are respectively over or under the aircraft being observed. As a consequence, This detracts from the overall warning characteristics of the high intensity lights and can create a problem with respect to potential hazards and mid-air collisions.

This particular invention overcomes the prior art deficiencies by incorporating a high intensity light at the wing tips and the tail, or wing tips only.

It has been generally accepted that high intensity lights at the wing tips and the tail, or wing tips only, when they are of the flashing type, are superior to those existing lights, namely the incandescent anticollision or supplemental indicator lights. However, in many aircraft that exist today, such lights are not in service. The capital investment of such aircraft demands that they be kept in service yet provided with the most modern and up to date means for visual warning. As a matter of interest, the Federal Aviation Agency has demanded that many aircraft now be equipped with high intensity lights that previously did not have to be so equipped.

As a consequence of the foregoing, high intensity lights are now being placed on existing aircraft. However, the placement of such lights presents a problem, inasmuch as the wiring of most aircraft cannot be used unless it incorporates the teachings of this invention. Specifically, if this invention is not utilized, it is necessary to rewire an aircraft for high intensity lighting. The foregoing rewiring of an aircraft, as can be appreciated, is more expensive.

Specifically, in order to rewire an aircraft, the wire must be "snaked" between ribs, structural members, and other elements of an aircraft to place the wire at the wing tips as well as the tail. In addition thereto, extra control means, power supplies, and other equipment must be utilized.

This invention overcomes the foregoing "retrofit" problems as well as enhancing the installation of this invention in new aircraft. Specifically, it enhances the capability of providing warning lights to an aircraft through the use of existing wires or a single set of wires for both the high intensity lights and the incandescent lights.

This invention utilizes the existing wires of an aircraft which relate to its position indicator lights. It places a timing module in the cockpit adapted to provide a particular signal tone or frequency for the response of the high intensity flashing lights. Additionally, it utilizes a combination of light assemblies incorporating the position indicator lights and the high intensity lighting or high intensity lights only, at the wing tips. Light assemblies are driven and respectively actuated by a power supply and decoder which is connected through the existing wiring of the aircraft (if need be) to the timing module.

The foregoing effectuates a flashing of the high intensity light in response to the output of the timing module. The entire invention enables a warning by each high intensity light at the wing tips and tail in combination with position indicator lights for both old and new aircraft. Specifically, in old aircraft, the existing wires can be used to transmit the timing pulse and generate a signal so that the power supply of this invention can cause a flashing of the high intensity light. In new aircraft, a single wire can be installed, thereby eliminating the necessity of dual systems and wires.

The foregoing lighting system is considered to be extremely helpful as a navigational aid, as well as providing safety and ease of maintenance with certain redundant features. Also, it incorporates the utilitarian features of being able to implace the invention within an aircraft having existing position indicator light wiring without the necessity of added wiring or substantially disassembling or rebuilding the aircraft.

SUMMARY OF THE INVENTION

In summation, this invention is a combination of position and high intensity lighting systems.

More specifically, the lights mount on the wings and tail, or wings only, in place of the conventional position lights. The lights and power supplies receive both power and timing signals through the existing position indicator light wiring in those cases where original wiring exists, and in new aircraft through a single wire. The power supply associated with each combination of position and high intensity light is designed to mount on the structural members of the aircraft.

A timing circuit functions to trigger and synchronize the lighting of the high intensity lights. The timing circuit generates short tone bursts which are placed on the position indicator light wires or onto a single wire in new aircraft.

Tone decoders are contained in each power supply which decode the signals from the timing circuit and convert them into trigger pulses to fire the high intensity lights. In this manner, the high intensity lights can be provided at the respective wing tips and tail sections without substantial modification and rebuilding of an aircraft.

The system can be operated in a position indicator light mode, a position indicator light and high intensity light mode, or both lights can be off. The power is supplied to the high intensity lights whenever the position indicator lights are on. However, they flash only when triggered by the pulse generated by the timing circuit.

BRIEF DESCRIPTION OF THE DRAWINGS

The invention will be more clearly understood by reference to the description below taken in conjunction with the accompanying drawings wherein:

FIG. 1 shows a schematic plan view of an aircraft with a general configuration of the wiring used with this invention;

FIG. 2 shows a view of the tail light module of this invention;

FIG. 3 shows a wing light module used in this invention mounted on a portion of the wing;

FIG. 4 is a fragmented sectional view along lines 4—4 of FIG. 3 showing the internal major elements of the wing tip lighting module;

DESCRIPTION OF THE PREFERRED EMBODIMENTS

Figure 5:
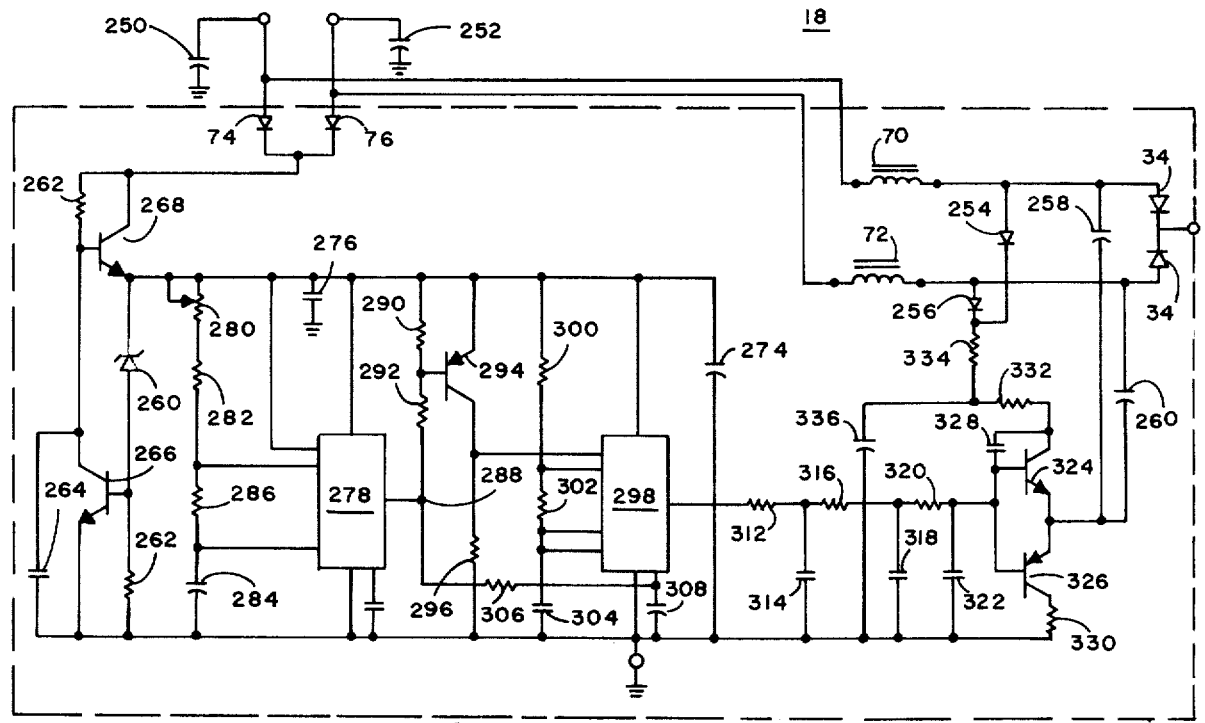
FIG. 5 shows a schematic diagram of the timer module of this invention.

Looking more specifically at FIG. 1, an aircraft structure is shown having a wing tip cover 10. The wing tip cover 10 has been removed in part, and can be in the form of any suitable structural member, or formed as a general portion of the skin of the aircraft wing. Internal to the wing tip cover 10 is a wiring rib 12 or any other suitable surface having a power supply and decoder module 14 mounted thereon. The power supply and decoder module 14 of this invention can be attached to the wing tip in any suitable manner. As can be understood, the module 14 is within a housing having a frame for the receipt of screws to attach it to the wing rib 12 or any other suitable surface.

The aircraft generally incorporates a series of switches on its dashboard either on the overhead or other location for the pilot to operate the aircraft. The dashboard of this particular aircraft has a switch and circuit breaker module 16 which can be overhead or mounted in front of the pilot. The module 16 has a three position switch 54 which is expanded upon in detail later in the specification. However, suffice it to say that the three positions of switch 54 provide for the position indicator lights and the high intensity lights to operate in combination or both lights can be placed in the off condition, or the indicator lights can operate by themselves.

Extrinsic to the switch and the circuit breaker combination 16 in the dashboard is a timer 18 which sends out pulses or tone bursts periodically. The timer 18 is connected to a series of wires W-1, W-2 and W-3, which can be the original position indicator light wires within the aircraft.

Figure 8:
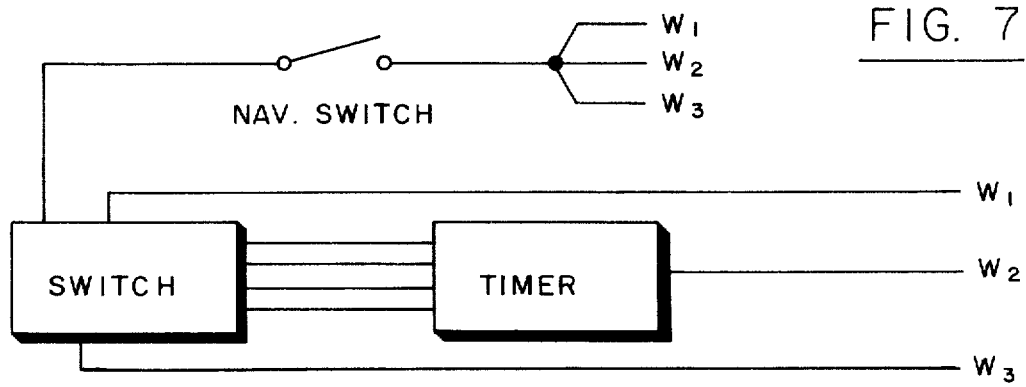
FIG. 8 shows a before and after wiring diagram of the system when mounted in an aircraft having navigational or indicator lights; and, FIG. 9 shows another general line diagram of the invention when placed within an aircraft.

Looking more specifically at FIG. 8, it can be seen where the navigational or indicator light switch has the timer interposed thereafter with the three respective wires, W-1, W-2 and W-3 emanating from the timer and the navigational switch. Of course, in the original form as the aircraft was manufactured, the wires W-1, W-2 and W-3 are in parallel to operate the position indicator or navigation lights.

The invention and high intensity lights can be mounted into a navigation and high intensity light module 20 for attachment to a wing. The module 20 as shown has been riveted to the aircraft skin or facing plate.

Within the module 20, a xenon flash tube 24 is provided. The xenon flash tube 24 emanates a beam of high intensity flashing light which allows the beam to signal the surrounding aircraft that a plane is in the area. In order to cause the xenon flash tube 24 to fire, a trigger wire 26 is utilized. The trigger wire 26 serves to ionize the gas in the xenon flash tube to cause it to luminesce. A trigger transformer 28 is utilized in order to provide the trigger wire 26 with the electrical firing capacity necessary to make the xenon lamp operate. A lead cable 30 is shown connected to the transformer 28 and the xenon flash tube 24 having a plus voltage wire, a trigger wire, and a ground lead therein.

Within the module 20, an incandescent navigation light 32 is provided. The incandescent navigation light can be similar to the lights which are provided for position indicators. Overlying the incandescent navigation light 32 is a filter 34 which can be a conventional red, green, or clear color depending upon its position with respect to the wings or the tail. A lamp base 36 for the incandescent navigation light 32 is utilized for mounting the lamp within a socket having a spring contact 38. The lamp 32 is served by a lead 40 which provides the power into the lamp.

The xenon flash tube 24 can have a reflector 41 which is generally parabolicly curved, and lies near the xenon flash tube 24. The reflector can be made of any particular material in order to provide the required reflection of the flash tube when it discharges.

FIG. 2 shows a tail light module which has been designated tail light module 44. The tail light module has a position light 46 and a high intensity flashing light 48. However, it should be understood that the modules for the win tips, namely modules 20 and 44 are only illustrative. The high intensity lights can be oriented in any particular manner. Additionally, the position indicator lights can be oriented therewith in any suitable manner to meet the configuration of the aircraft, as well as other lighting requirements. The foregoing embodiments, although useful for practising the invention, can be oriented as modules or as separate units wired in the manner to be described.

Looking more particularly at the detailed showing of the timer 18, circuit breakers 50 and 52 are shown connected to a bus 51. The power to the timer is received through the foregoing circuit breakers and bus by means of a connecting switch 54 which is the three position switch previously described. The three position switch, of course, has the navigation and high intensity light position, an off position, and a navigation light only position.

In order to protect the system, fuses 56 and 58 are provided and the timer is grounded by any suitable ground means 60. The timer 18 is connected to the power supplies and decoder modules 14 by means of interfacing fuses 62, 64 and 66 which go to the respective wings and tail section.

The system also incorporates inductors 70 and 72. The inductors 70 and 72 serve the function of keeping the pulses generated by the timer from going back into the plane's system. In other words, the inductors 70 and 72 isolate the aircraft from the lighting system of this invention.

Diodes 74 and 76 isolate the respective wings so that in the eventuality one wing light is lost, there is still power to the timer. In other words, the diodes are such that they function to provide protection to the respective indicator lights and the high intensity lights in each respective wing. It can be appreciated that this allows one of the wing lights to always function even if the other one has lost power. In the eventuality a circuit breaker is activated, the other light modules will still operate.

As an aside, it should be noted that the tail module 44 is interconnected with each one of the respective power trains and a consequence, will operate when either one of the wing modules 20 are out.

Figure 9:
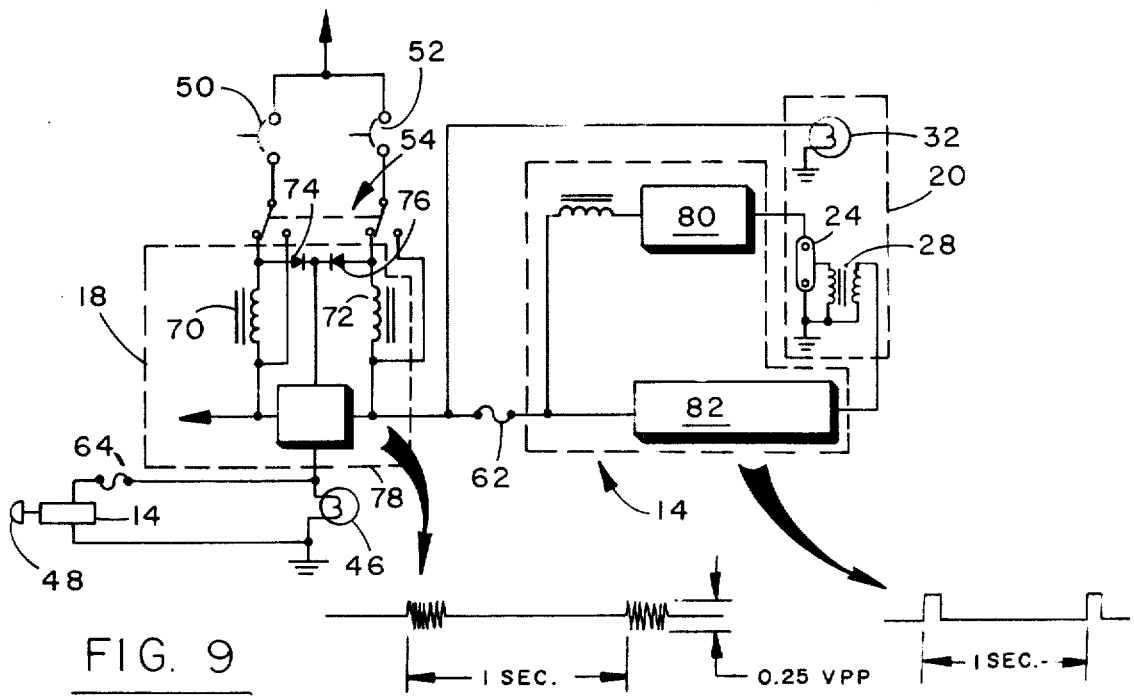

The timer electronics have been designated within the dotted outlines 78. The timer electronics are shown in FIG. 9 as well as the detailed schematic of FIG. 5.

The power supply for each module is shown with the dotted line configuration 80. The tone decoder for the respective locations is indicated within dotted line 82. These are both shown respectively in FIGS. 6 and 9.

The Power Supply

An indicator 84 serving as a choke filters the power supply. This prevents noise from going back to the airplane and provides radio protection or protection against electromagnetic interference (EMI).

Figure 6:
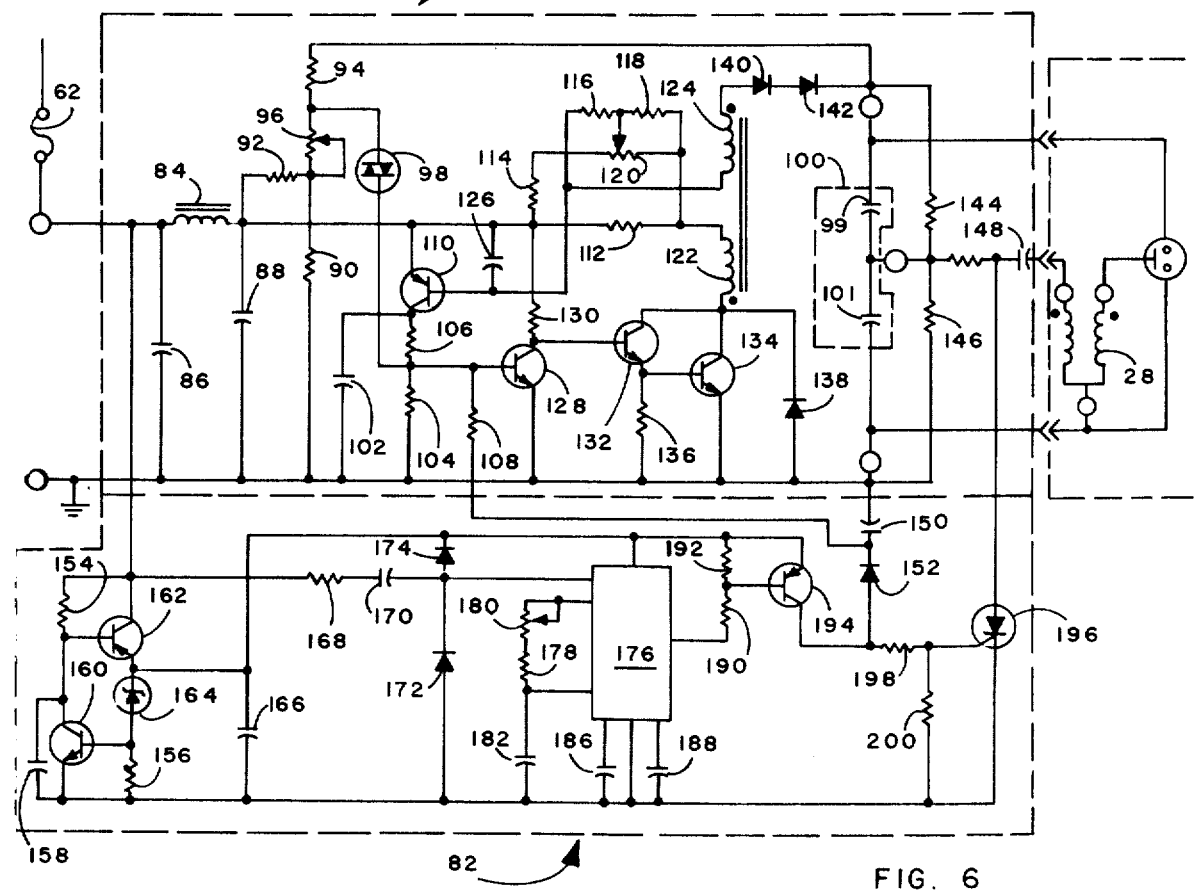
FIG. 6 shows a schematic diagram of the power supply and decoder for each particular light.
Figure 7:
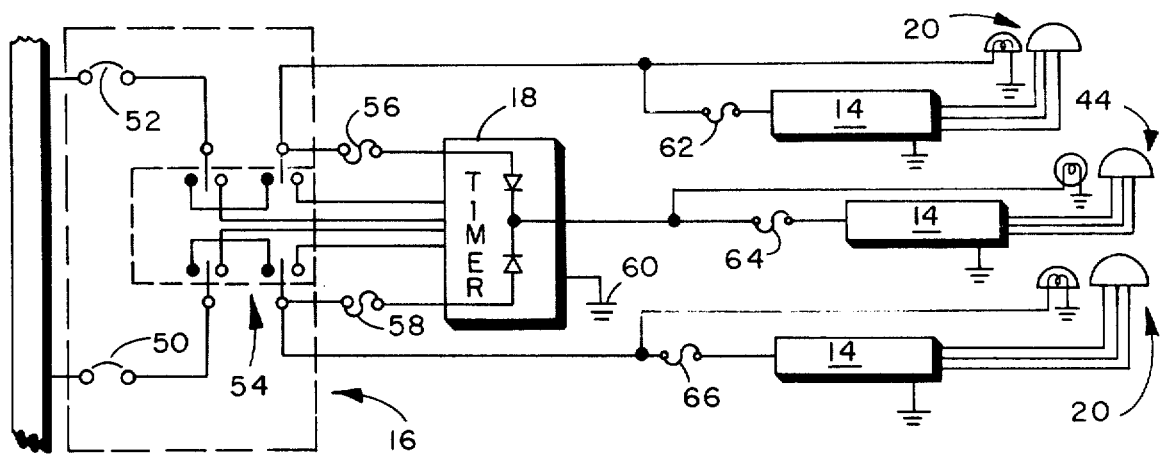
FIG. 7 shows a general line diagram of the system within the aircraft.

Looking more specifically at FIG. 6, the power supply 80 is shown and is the power supply within module 14. The power supply has two capacitors which serve as part of the filter network with the inductor 84. This also helps to eliminate EMI of the airplane's electronic system.

An overvoltage control network serves to protect the capacitors and the other devices that are powered by the power supply. Specifically, the overvoltage control network incorporates resistors 90, 92, 94 and 96, which is a variable resistance. Part of the overvoltage control network is provided by a bipolar device referred to as a diac.

Looking further into the circuit, capacitors 99 and 101 are shown which effectively provide the function of one large capacitor 100. These capacitors 99 and 101 are discharged when there is sufficient voltage built up on them at a charge rate which is generally more rapid then the discharge rate. In other words, the capacitors are a source of energy, but will not function until they have built up sufficient voltage for operating the high intensity light.

A capacitor 102 is provided to delay the turning on of the transistors which cause the circuit to function. The transistor 128, which is a switching transistor, is biased by resistors 104 and 106.

A second resistor 108 serves as a shutdown resistor which prevents incandescence of the high intensity light or strobe. The high intensity incandescence is commonly referred to as holdover, and is prevented from occurring by resistor 108.

The current sensing transistor 110 senses current primarily in resistor 212. However, a current sensing network is provided by resistors 114, 116, 118 and 120 which is a variable resistance. Resistor 120 serves the function of adjusting the network.

Looking more specifically at the connection of the current sensing network, it is seen that it is connected to a flyback transformer comprising a primary coil 122 and a secondary coil 124. A capacitor 126 is incorporated in the system to effectively put a lag within the current control means. Transistor 128 is provided to function generally as a switch in response to the current shutdown signal from transistor 110. The transistor 128 also functions in response to a voltage shutdown signal from the diac 98 and holdover shutdown signal from the decoder 82 which will be expanded upon.

A third transistor 132 is connected so that its base is in connected relationship to resistance 130. A transistor 134 has its base connected to transistor 132 and serves the function of a power switch biased in part by transistor 132. A resistor 136 serves to bias the foregoing transistors.

A diode 138 is incorporated in the system for commutation. It serves to commutate the reverse voltage transient developed across transistor 134. This voltage is a reverse voltage transient generated by the primary winding 122 of the flyback transformer comprised of coils 122 and 124.

Two diodes 140 and 142 serve to rectify the output of the secondary coil 124 of the flyback transformer. A pair of resistors 144 and 146 within the voltage divider network are utilized for causing the trigger circuit to function.

A trigger capacitor 148 stores the energy that is used to discharge and cause the high intensity light or xenon tube 24 to flash. The trigger capacitor stores the energy and is connected to the trigger transformer 28 which ionizes the gas in the high intensity tube 24, thereby causing a luminescence of the gas therein.

Decoder

Looking more specifically at the decoder outlined by the dotted lines 82, it can be seen that it is interconnected to the power supply 80 of the module 14 which is mounted in the wing. The decoder and the power supply can be effectively placed on a single board, or a series of circuit boards interconnected and mounted into a physical package which is then mounted on the aircraft. As can be appreciated, the physical package can be encased in any suitable means such as a metal box or a casting or any other suitable container.

A capacitor 150 is shown, which is charged and slowly drains as part of an RC function. This prevents the holdover flash referred to before in the xenon tube which generally relates to the holdover shutdown signal through resistor 108.

A blocking diode serves to prevent the current from going back into the decoder network 82.

Looking more particularly at the regulator portion of the decoder, a pair of biasing resistors 154 and 156 are provided. A capacitor 158, transistors 160 and 162, as well as a zener diode 164 is utilized to provide voltage regulation for the decoder outlined in block 82. The general function of the foregoing elements is to provide a regulated source of voltage for the device which is reliable. Thus, the requirement for the attendant transistors and resistors.

A filtering capacitor 166 is utilized to filter unwanted transients. A resistor 168 and a capacitor 170 form an RC network. The RC network limits the current to two clipping diodes 172 and 174. The clipping diodes protect the input circuit.

An integrated circuit in the form of a phase locked loop 176 is provided. The phase locked loop in this case is a type of tone decoder and serves to decode the signal that is derived from the power line which emanates from the timer. Resistors 178, 180 and a capacitor 182 establish the frequency of the tone decoder 176. Capacitor 186 sets the band width of the tone decoder, and capacitor 188 is provided to set the delay of the tone decoder.

Two bias resistors 190 and 192 are connected at the base of a transistor 194. The transistor 194 is a driver and inverter and functions to invert the signal which has been decoded by the filter 176.

A silicone controlled rectifier (SCR) serves to trigger the xenon tube by discharging capacitor 148, as controlled by the driver or inverter 194. The SCR is biased by resistors 198 and 200.

Timer Module

The timer module 18 generally is shown outlined by the dotted configuration 78 and is the general timer configuration shown in the lined diagram and labeled 18. The timer module 18 is connected to two capacitors 250 and 252 which serve to suppress electromagnetic interference (EMI). Also, the diodes 74 and 76 previously mentioned, provide the function of isolating the respective wings. In this manner, regardless of whether or not one power supply module is out, the other ones will function. In addition thereto, the inductors 70 and 72 have been shown which keep the pulse from going back into the plane.

Diodes 254 and 256 serve the function of providing power to the power transistors which shall be described. In this manner, if one source of power is lost, there is a secondary source of power to operate the system. This enables the system to effectively avoid the loss of all lights, either the high intensity, or the position lights, or the loss of all the lights on one respective wing.

Coupling capacitor 258 and 260 couple the tone or signal pulse into the lines in a manner to be described.

Looking toward the input side of the timer, a regulator is shown comprising resistors 261 and 262. Also, a capacitor 264, transistors 266 and 268 and a zener diode 270 comprise the remainder of the regulator. These roughly correspond in function to the former regulator elements numbered 154 through 164 in the decoder portion of the module 14.

A low pass filter in the form of a capacitor 274 serves to roll off the frequencies at the low end of the band. A second capacitor 276 serves to roll off the frequencies on the high side and functions as the high pass filter.

An integrated circuit 278 functions as a timer to provide a negative going pulse, which is the pulse used to generate a timing signal to fire the high intensity tube 24. The timer 278 is a free running astable multivibrator. It provides a pulse on a timed basis approximately every 1.2 seconds. The pulse duration is approximately 25 milliseconds. However, the foregoing timing function of the pulse can be any particular time that the system requires to work. In other words, as long as the timing of the pulse is greater than the time required to reactivate the system and charge the flash capacitors 99 and 101, the pulse can initiate and function at that rate.

A resistor in the form of a variable resistance 280, along with a second resistor 282, functions with a capacitor 284 to provide an RC function. The RC function establishes the periodicity of the timed pulse on the timer 278. A resistor 286 establishes the width of the pulse of the astable multivibrator 278.

Looking more particularly at the output of the astable multivibrator, or timer 278, it is seen that point 288 which is the output, is connected to two inputs. It is firstly connected to biasing resistors 290 and 292. The biasing resistors bias a transistor 294. The resistors 290 and 292 bias the transistor 294 on, when the putput at 288 of the multivibrator 278 is low. The transistor 294 is an inverter transistor and serves to invert the output of the multivibrator 278. The resistor 296 connected to the collector of transistor 294 is a load resistor.

A second astable multivibrator in the form of an integrated circuit 298 is provided. The second astable multivibrator circuit 298 is triggered on by the transistor 294. The second multivibrator circuit 298 determines the frequency of what the pulse is running at. If the frequency is not within the range of the phase locked loop 176, the device will not function. In other words, although the pulse might initiate on a timed basis periodically, the frequency thereof must be established in some mode for capture purposes. The astable multivibrator circuit 298 serves to establish this frequency for capture by the decoder.

The multivibrator circuit, or astable multivibrator 298 is provided with an RC function in order to characterize the frequency. In order to characterize the frequency, resistors 300 and 302 form the resistance function of an RC network with a capacitor 304 to establish the rate of frequency.

A resistor 306 and a capacitor 308 establish the sweep rate of the frequency output of the astable multivibrator 298. In other words, the rate of the frequency output is established by the RC function of resistor 306 and capacitor 308. The RC function of the resistor 306 and capacitor 308 sweeps the frequency from the high to the lower frequency to accommodate the band width of the decoder 82. In addition thereto, it serves to compensate for temperature variations at the wing tip and the inside of the cabin.

As can be appreciated, the timer 18 and the power supply and decoder module 14 are in different temperature locations, during the operation of the aircraft. Specifically, the timer module 18 is within the aircraft while the power supply and decoder module 14 is on the wing tip. As a consequence, the components in each respective area must be temperature compensated and compatible for receiving the frequency emanating from the timer 18 in a broad range of temperatures. The foregoing circuit provides for this compensation.

A series of respective resistors 312, 316 and 320 and capacitors 314, 318 and 322 provide a sine wave shaping network. Specifically, they take a square wave and shape it into a sine wave for purposes of characterizing the output of the astable multivibrator 298, into a sine wave shape. In this manner, the output can be more effectively utilized by the decoder 82.

Transistors 324 and 326 form a complimentary symmetry power amplifier. Specifically, the power amplifier provided by transistors 324 and 326 puts out substantial power because the character of the load requires substantial power.

A capacitor 328 is utilized as a high frequency feedback capacitor to the power amplifier network. In addition thereto, resistors 330 and 332 are utilized in the network in order to provide a current limiting function for the power amplifier.

A resistor 334 and a capacitor 336 serve to establish a filter from the power amplifier and eliminates regenerative feedback to the power amplifier.

Diodes 340 and 342 are provided to serve the function of allowing the tail light module 44 to operate from wire W-2 in response to the tone burst from either wire 1 or wire 2 from the timer. In other words, depending upon which respective diode breaks down initially, the tone burst from either W-1 or W-3 will trigger the action of the power supply and decoder module 14 connected to light module 44 at the tail.

OPERATION OF THE INVENTION

In operation, the pilot of the aircraft decides whether he will light the position lights, the high intensity flashing lights in combination with the position lights, or have no lights at all in operation. At this moment in time, the pilot will switch the three position switch 54 into the proper location therefor.

After the decision has been made to operate the lights in one of the foregoing manners, the power is supplied on a continuing basis to the position indicator lights if they are to be operated, or to the position indicator lights and the high intensity lights in response to pulses in the eventuality the high intensity lights are to be operated.

When the high intensity lights are to be operated, the timer function sends a pulse down lines W-1, W-2 and W-3 to the power supply and decoder module 14 which comprises the power supply 80 and the decoder 82. The power supply 80 maintains sufficient power to drive the high intensity light, while the decoder 82 causes a signal or pulse to emanate for ionizing the gas by means of the trigger wire 26. The trigger wire 26 effectively causes a luminescence of the gas by ionization and electrical discharge within the tube to effectuate a flashing, high intensity light for warning purposes.

After the pulse has been delivered to the trigger wire 26, the next pulse is in a time sequence therewith for a second triggering activity. However, in the meantime between triggering pulses, the voltage on the discharge capacitor 100 is built up to allow a discharge of the current through the gas in the xenon tube 24 after the trigger circuit has functioned to ionize the gas.

Variations

Numerous variations and alternative embodiments can be incorporated in this invention. Specifically, various wiring modes can be utilized in order to allow the invention to operate with the existing wires of an aircraft. Furthermore, various tone and signal emanating devices can function in combination with various decoders for receiving the pulses. In addition thereto, various pulses can provide different functions with regard to the driving of the high intensity lights.

As can be understood, this invention can be utilized in a retrofit capacity with the wiring of the aircraft, or new wiring can be implaced in the aircraft. Regardless of how the wiring is provided, the invention operates in an easy and facile manner. Furthermore, as can be understood, various power supplies in addition to the different frequency and tone indicators can be used.

As a consequence of the foregoing, this invention has broad application and numerous embodiments. Thus, the invention is only to read in light of the teachings thereof as defined by the following claims.

We claim:

1. Apparatus for providing a warning light system to an aircraft having electrical power, comprising:

at least one position indicator light and high intensity light mounted on the aircraft;

wires internally located within said aircraft leading to the respective wing tip areas for electrical connection to the position indicator lights and the high intensity light;

means connected to said wires to generate a signal of a pre-established frequency thereon;

means to connect said wires to the power of the aircraft for powering said position indicator lights and said high intensity lights while said pre-established frequency signal is being generated; and, frequency detection means connected to said wires and said high intensity light for responding to said signal which is generated to cause said high intensity light to be lit at the same time said position indicator light is lit.

2. The apparatus as claimed in claim 1 wherein:

said wires are the original aircraft wires leading to the position indicator lights.

3. The apparatus as claimed in claim 2 wherein:

said signal of a pre-established frequency activates a triggering circuit for said high intensity light causing it to flash in response to said signal.

4. The apparatus as claimed in claim 3 wherein:

said high intensity light is a xenon flash tube.

5. The apparatus as claimed in claim 1 wherein:

said lights are both within a module for attachment to said aircraft wing.

6. The apparatus as claimed in claim 5 further comprising:

a power supply connected to said module and placed in said wing for powering said high intensity light.

7. The apparatus as claimed in claim 6 wherein:

said frequency detection means is mounted adjacent said power supply to respond to the signal from said signal generating means.

8. The apparatus as claimed in claim 1 wherein:

said signal generation means comprises a tone generator which places a tone on the wires; and, said means for responding to said tone comprises a decoder and a power source for operating the high intensity light when the decoder decodes the signal emanating from said signal generation means.

9. The apparatus as claimed in claim 8 further comprising:

a tail lighting module; and, a wire interconnecting said tail lighting module to said tone generating means wherein said tail lighting module is activated by the signal to said lighting means.

10. The apparatus as claimed in claim 9 further comprising:

switch means to cause said position indicator lights to operate solely by themselves or in conjunction with said high intensity flashing light.

11. The improvement in an aircraft lighting system having wires in the aircraft for servicing navigation lights comprising:
   a timer module mounted in said aircraft connected to the navigation light wires and having means for issuing a pre-established frequency signal onto said wires;
   means for connecting said wires to the power supply of the aircraft;
   a lighting power supply and frequency decoder module connected to said navigation light wiring for placement on the wings; and,
   navigation and high intensity lights connected to said power supply and decoder module for activation of the high intensity lights by the pulse generated from said timer module while at the same time said navigation lights are simultaneous lit.

12. The apparatus as claimed in claim 11 further comprising:
   a packaged module for said power supply and said decoder for mounting in said wing.

13. The apparatus as claimed in claim 12 further comprising:
   a prepositioned switch for activating said timer module so that the navigation lights can be operated singly or simultaneously with said high intensity flashing lights.

14. The apparatus as claimed in claim 11 further comprising:
   a timer module having a first astable multivibrator circuit to emanate a pulse.

15. The apparatus as claimed in claim 14 further comprising:
   a timer module having a second astable multivibrator circuit to shape the frequency of the pulse.

16. The apparatus as claimed in claim 15 further comprising:
   means to change the rate of the pulse; and,
   means to change the frequency of the respective astable multivibrator circuits.

17. The apparatus as claimed in claim 16 further comprising:
   a decoder having a phase locked loop for decoding the signal emanated by said timer; and,
   power means and capacitive discharge means within said power supply connected to said decoder for purposes of providing current to the high intensity light.

18. The apparatus as claimed in claim 17 further comprising:
   a xenon flash tube triggered by a trigger wire which serves to ionize the gas in the tube so that an electrical discharge can take place through said ionized gas to provide a flashing light.

19. The apparatus as claimed in claim 11 further comprising:
   a tail light module having a position indicator light, and a high intensity flashing light which is activated by said timer.

20. The apparatus as claimed in claim 19 wherein:
   said tail module is connected to respond to the same pulse transmitted to a respective wing tip light.

* * * * *